Aug. 8, 1939. G. F. LINCKS 2,169,104
PROTECTIVE AND MAINTENANCE EQUIPMENT FOR ELECTRIC
CIRCUIT INTERRUPTING DEVICES
Filed Jan. 13, 1939
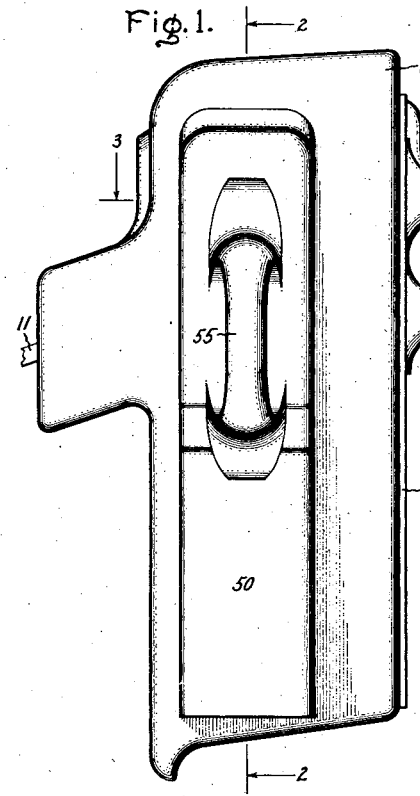
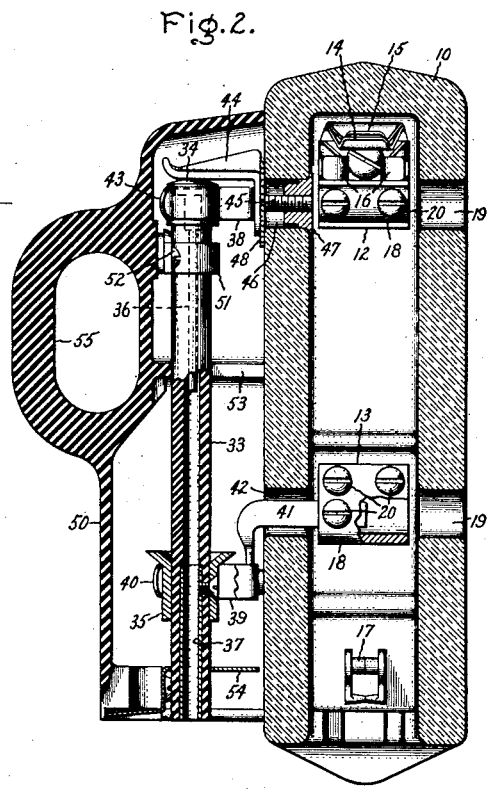
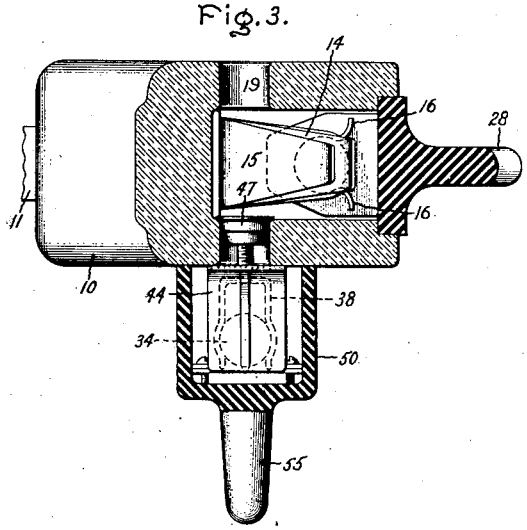
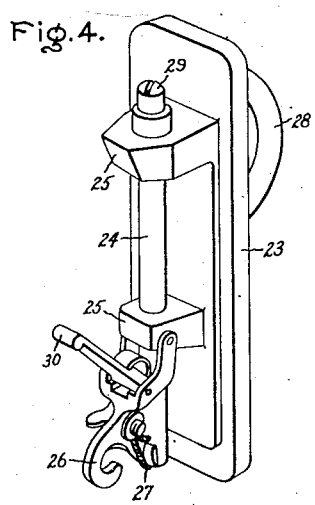
Inventor:
George F. Lincks,
by Harry E. Dunham
His Attorney.

Patented Aug. 8, 1939

2,169,104

UNITED STATES PATENT OFFICE 2,169,104

PROTECTIVE AND MAINTENANCE EQUIPMENT FOR ELECTRIC CIRCUIT INTERRUPTING DEVICES

George Fred Lincks, Pittsfield, Mass., assignor to General Electric Company, a corporation of New York Application January 13, 1939, Serial No. 250,786

8 Claims. (Cl. 200—113)

The present invention relates to electric circuit interrupting devices such as fuse cutouts, line sectionalizing switches, and the like, and more particularly to improvements in protective and maintenance equipment for such devices.

In some applications of fuse cutouts and other forms of circuit interrupting devices, troubles have been experienced from flashover between the open circuited terminals or contacts of the devices due to lightning surges. For example, in an installation where a fuse cutout is employed for transformer protection and is connected on the line side of the lightning arrester employed with the transformer, blowing of the fuse link leaves the cutout unprotected and tends to form at the line terminal of the cutout a reflecting point for lightning surges. As a result of this there may occur flashovers between the cutout terminals with the possibility of damage to, or even complete destruction of, the cutout casing or other insulating support. A similar condition may exist where a fuse cutout is employed for line sectionalizing purposes, since the circuit between the terminals of the cutout may be left open due either to automatic operation of the cutout or to manual removal of the fused circuit interrupting element from between the terminals. In such case both terminals of the cutout tend to become reflection points for recurrent surge conditions with resultant danger of damaging flashover. This danger likewise may exist with a sectionalizing switch employing a non-fused disconnect blade, if the blade is left in open position, or is entirely removed, as is sometimes done on rural lines.

It is a principal object of the present invention to provide a simple and reliable protective equipment which may be employed effectively and economically for protection of fuse cutouts, sectionalizing switches or other forms of interrupting devices to avoid the troubles above-mentioned in any installations where such devices may be subjected to lightning surges.

A further object of the invention is the provision of an improved maintenance device which may be employed for servicing as well as protection of fuse cutouts, sectionalizing switches, and like forms of interrupting devices.

Other objects and the details of that which I consider to be novel and my invention will become apparent from the following description and the claims appended thereto, taken in conjunction with the accompanying drawing in which Fig. 1 shows in elevation an exemplary embodiment of my invention as applied to an enclosed fuse cutout or like circuit interrupting device; Fig. 2 is a sectional elevation along line 2—2 of Fig. 1 showing more in detail the arrangement of the internal parts of the apparatus of Fig. 1; Fig. 3 is a sectional plan view along the line 3—3 of Fig. 1; and Fig. 4 shows an exemplary form of electric switching unit adapted to be mounted in the casing of the cutout of Fig. 1.

The illustrated casing, designated 10 in the drawing, is of a common form employed in enclosed fuse cutouts. This casing is constructed of porcelain or other suitable insulating material and is provided at the rear with a mounting bar 11 for attachment of the casing to any suitable support. Mounted within the casing in spaced apart relationship are stationary line terminal contacts 12 and 13. Upper contact 12 is provided with a resilient contact finger 14, backed by means of a spring strip 15, for engagement with the upper terminal of an electric switching unit mounted in the casing. Contact 12 is provided also with latching fingers 16 for restraining such switching unit in operative position. Lower contact 13 is arranged to be engaged by a lower terminal or contact arm of a switching unit mounted in the casing. For support of such switching unit there is provided a hinge bracket 17 adjacent the lower end of the casing. Both contacts 12 and 13 are provided with socket portions 18 for receiving line conductors or leads (not shown) which are inserted through openings 19 in one side of the casing and are clamped in the sockets by means of screws 20.

An exemplary form of switching unit adapted to be mounted in casing 10 is illustrated in Fig. 4. This unit comprises in the main a door 23, constructed of insulation and adapted to close the open front of casing 10, and a circuit interrupting element 24 supported by bosses 25 on the inner side of the door. A hinge lever 26, pivotally attached to the door and adapted to engage hinge bracket 17, is provided for supporting the switching unit in the casing. In the switching unit illustrated, the circuit interrupting element 24 is in the form of a fuse holder having therein a fuse link 27 the lower end of which is connected to lever 26 in the manner shown in Fig. 4 so as normally to hold the lever in rigid relation to the fuse holder. In case automatic fused protection is not desired, a suitable form of disconnect blade may be substituted for the fuse holder. With hinge lever 26 in engagement with bracket 17, the switching unit may be operated manually into and out of operative position by means of a handle 28 on door 23. Latching fingers 16 of upper stationary contact 12 are arranged to engage the upper terminal 29 of the fuse holder or other circuit interrupting element to restrain the switching unit in operative position, and a pivoted contact arm 30 is provided for engagement with lower stationary contact 13.

With a fused circuit interrupting element and a supporting lever arrangement of the form shown in Fig. 4, operation of the fuse link in the fuse holder will release the supporting lever so that the switching unit may move outwardly and downwardly to a dropped-out position in a manner well known in the art, thereby opening the circuit between the stationary contacts of casing 10. In case a hinge element is employed which is fixed relative to the fuse holder and other parts of the switching unit, operation of the fuse link will simply effect opening of the circuit between the stationary contacts without dropout of the switching unit. In either of these cases, the open circuit condition between the stationary contacts renders the cutout subject to flashover between the stationary contacts due to lightning surges if no protective means is employed. Such flashover may damage the casing or other parts of the cutout and even may cause destruction of the casing. As previously mentioned, a similar danger may exist if a switching unit, employing either a fused or a non-fused circuit interrupting element, is left in open circuit position or entirely removed. To avoid this danger I have provided a protective equipment now to be described.

The protective equipment of my invention comprises in the main an expulsion gap protective device with suitable supporting and connection means. The expulsion gap device comprises an expulsion tube 33 of suitable insulation material, open at its lower end and closed at its upper end by a terminal cap 34. Tube 33 is provided also with a second terminal 35 in spaced relation to terminal cap 34, and has a rod electrode 36 and a sleeve electrode 37 connected respectively with terminals 34 and 35 and arranged in spaced relationship to form an arcing gap within tube 33. For support of the expulsion gap protective device there is provided a pair of auxiliary contacts 38 and 39. Lower contact 39 has clip arms 40 for engagement with lower terminal 35 of the expulsion tube, and has also an L-shaped extension 41, a portion of which extends laterally through an opening 42 in the side of casing 10 into socket portion 18 of lower stationary line contact 13 where the extension is clamped by means of one of the screws 20. Upper contact 38 has clip arms 43 arranged to engage the terminal cap 34 at the upper end of tube 33, and has also an abutment 44 arranged to bear against the end of terminal cap 34. Contact 38 has also a screw-threaded projection 45 which extends into an opening 46 in the wall of casing 10 adjacent upper stationary line terminal 12. Projection 45 is secured in opening 46, by means of a flanged nut 47, in such manner that the inner end of the projection is disposed in spaced relation to contact 12, thereby providing a gap. A gasket 48 is provided for sealing the junction between auxiliary contact 38 and the wall of casing 10 around opening 46. Contact 38 may, if desired, be connected directly and solidly with upper line contact 12, but it is preferable to provide the gap as described above so that the external expulsion tube will not be subjected normally to the full voltage across the line contacts when the circuit between the line contacts is broken due either to automatic fuse operation or open circuit condition of the main circuit interrupting element, as previously described.

With the arrangement illustrated, upon the occurrence of a lightning surge during any period when the circuit is open between line contacts 12 and 13 for any of the reasons heretofore mentioned, a discharge path is provided between the line contacts for passage of the impulse current. This path extends from line contact 12 through the gap between contact 12 and the arcing point provided by the inner end of projection 45, thence through contact 38, terminal cap 34, electrodes 36 and 37 and the gap therebetween, terminal 35, auxiliary contact 39 and extension 41 to line contact 13. The lightning surge then may be dissipated either by the length of line connected with the circuit interrupting device or by lightning arresters or other equipment installed at other points on the line. Arcing between electrodes 36 and 37 due to follow-up current is extinguished within tube 33 in the well known manner of expulsion gap interrupters. Thus, flashover in casing 10 between line contacts 12 and 13 is prevented so that there is no danger of damage to the casing or other parts of the circuit interrupting device.

For protection of the expulsion gap interrupter from weathering and for manipulation of the interrupter into and out of connected position between auxiliary contacts 38 and 39, there is provided an insulating cover 50 which is attached to expulsion tube 33 by means of strap 51 and screws 52. This cover is closed on three sides and at the top and its fourth side is adapted to abut relatively tightly against and be closed by the side of casing 10. A gas barrier 53 is formed on the inner side of the cover so as to extend between auxiliary contacts 38 and 39. A second barrier 54 of metal, as shown, or insulation, is provided at the lower end of the cover to retard the rising of expulsion gases from the lower end of tube 33 into the interior of the cover to cause flashover between contacts 38 and 39. Barrier 54 also prevents the entrance into the cover of insects which might build nests which would result in short-circuiting or flashover. An integrally formed handle 55 is provided for safe and convenient manipulation of the cover and expulsion gap interrupter into and out of operative position.

As previously mentioned, upper auxiliary contact 38 may if desired be solidly connected with upper line contact 12, and in such case other forms of electric devices may be substituted for the expulsion gap interrupter 33 and the maintenance unit thereby provided may be employed for other purposes. For example, if a fuse (not shown) is substituted for the expulsion gap interrupter, the maintenance unit may be employed in a well known manner for opening the switching unit of the main circuit interrupting device under load. By the employment of such an expedient, arcing between the contacts of the main circuit interrupting device is prevented since the circuit interruption is effected by the fuse of the maintenance device.

Also, a solid conducting element or a fuse may be substituted for the expulsion gap interrupter 33 when it is desired to jumper the line contacts 12 and 13 for removal of the main circuit interrupting element without opening the circuit. In this case the cover 50, with its handle 55, serves as a safe means for manipulation of the jumpering conductor into and out of connected position.

Thus it will be seen that the improved maintenance device of my present invention may serve as a convenient accessory to be carried around by linemen and employed for various servicing operations on cutouts or other circuit interrupting devices equipped with the necessary auxiliary contacts.

From the foregoing it will be seen that I have provided a simple and low cost equipment for protection of circuit interrupting devices from damage due to lightning surges and have provided also a useful form of maintenance device which may be readily modified for various purposes and conditions encountered. It is contemplated that other modifications of the exemplary embodiment herein disclosed will suggest themselves to those skilled in the art, and it is intended therefore that such other modifications as do not depart from the true spirit of the present invention shall come within the scope of the appended claims.

What I claim as new and desire to secure by Letters Patent of the United States is:

1. The combination with an electric circuit interrupting device including an insulating support having spaced stationary line terminals mounted thereon and means for supporting an electric switching element removably in position to bridge said terminals, of an electric protective device including an expulsion tube having spaced electrodes providing an arcing gap in the tube, means in addition to said first mentioned supporting means for supporting said protective device on said insulating support and maintaining the protective device in operative position irrespective of whether or not a switching element is supported in a position bridging said terminals, and means cooperative with said protective device to provide an impulse discharge path between said contacts by way of said electrodes and expulsion tube.

2. The combination with an electric circuit interrupting device including an insulating support having mounted thereon a pair of spaced stationary line terminal contacts arranged to be electrically bridged by a circuit interrupting element engaging the contacts, of a pair of auxiliary stationary contacts mounted on said support and electrically associated respectively with said line contacts, an expulsion gap protective device including an expulsion tube having spaced electrodes providing an arcing gap in the tube and spaced terminals for said electrodes, means supporting said tube with said terminals respectively engaging said auxiliary contacts, and means including said protective device operative to provide an impulse discharge path between said line contacts by way of said electrodes and expulsion tube.

3. The combination with an electric circuit interrupting device including an insulating support having mounted thereon a pair of spaced stationary line terminal contacts arranged to be electrically bridged by a circuit interrupting element in engagement therewith; of an expulsion gap protective device including an expulsion tube having spaced electrodes providing an arcing gap in the tube and spaced terminals for said electrodes, and a pair of electrically conductive mounts for said protective device, said mounts being carried by said insulating support and having means engageable with said electrode terminals, one of said mounts being mechanically and electrically connected to one of said line contacts and the other of said mounts being supported with a portion thereof in insulated spaced relation to the other of said line contacts so as to provide a gap.

4. The combination with an electric circuit interrupting device including an insulating casing having a pair of spaced stationary line terminal contacts mounted therein and arranged to be bridged by a circuit interrupting element in the casing; of a pair of auxiliary contacts disposed exteriorly of said casing and having conductive portions extending through openings in a side wall of the casing into electric association respectively with said line contacts, an expulsion gap protective device including an expulsion tube having spaced electrodes providing an arcing gap in the tube and having spaced terminals for said electrodes, means supporting said tube exteriorly of said side wall of the casing with said terminals respectively engaging said auxiliary contacts, and means including said protective device operative to provide an impulse discharge path between said line contacts by way of said electrodes and expulsion tube.

5. The combination with an electric circuit interrupting device including an insulating casing having a pair of spaced stationary line terminal contacts mounted therein and arranged to be bridged by a circuit interrupting element supported in the casing, a side wall of said casing having openings therethrough respectively adjacent said contacts; of an expulsion gap protective device including an expulsion tube having spaced electrodes providing an arcing gap in the tube, and a pair of conductive mounts electrically connected respectively with said electrodes and arranged to support said tube exteriorly of said side wall of the casing, one of said mounts having a portion extending through one of said openings and mechanically and electrically connected to the corresponding one of said line contacts, the other of said mounts being attached to said casing and having a portion extending through another of said openings into close insulated spaced relation with the other of said line contacts.

6. The combination with an electric circuit interrupting device including an insulating casing having a pair of spaced line terminals mounted therein and arranged to be bridged by a circuit interrupting element in the casing, a side wall of said casing having openings respectively adjacent said terminals; of an electric protective device including an expulsion tube having spaced electrodes providing an arcing gap in the tube and having spaced terminals respectively for said electrodes, a pair of conductive elements connected respectively with said last mentioned terminals and having portions projecting through said openings into electric association respectively with said line terminals, means including said protective device providing an impulse discharge path between said line terminals, an insulating cover for said protective device having an open side, and means supporting said cover with the open side thereof in abutment with and substantially closed by the exterior of said side wall of the casing.

7. In combination with an electric circuit interrupting device including an insulating casing having a pair of spaced line terminals mounted therein; an auxiliary electric device having spaced terminals, a pair of conductive elements connected respectively with said last mentioned terminals and projecting laterally from the body of said auxiliary device in spaced relationship, means supporting said auxiliary device and conductive elements with the auxiliary device exteriorly of said casing and said conductive elements extending through openings in a side wall of the casing into electric association respectively with said line terminals, means including said conductive elements cooperative with said auxiliary device to provide a shunt path between said line terminals, and an insulating cover attached to said auxiliary device, which said cover has an open side and is supported with said open side in abutment with and substantially closed by the exterior of said wall of the casing.

8. In combination with an electric circuit interrupting device including an insulating casing having a pair of spaced line terminals mounted therein; an auxiliary electric device having spaced terminals, a pair of conductive mounts carried by said casing exteriorly of a wall of the casing and having portions extending respectively through openings in said wall into electric association respectively with said line terminals, said mounts having means to engage the terminals of said auxiliary device and to detachably support said auxiliary device exteriorly of said wall of the casing, means including said mounts cooperative with said auxiliary device to provide a shunt path between said line terminals, and an insulating cover attached to said auxiliary device and having an open side arranged to abut and be closed by the exterior of said wall of the casing, said cover being arranged substantially to enclose said auxiliary device and having a handle for manipulation of the auxiliary device into and out of engagement with said mounts.

GEORGE F. LINCKS.